Figure 6:
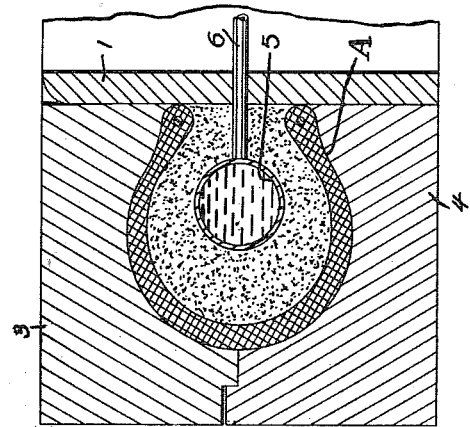

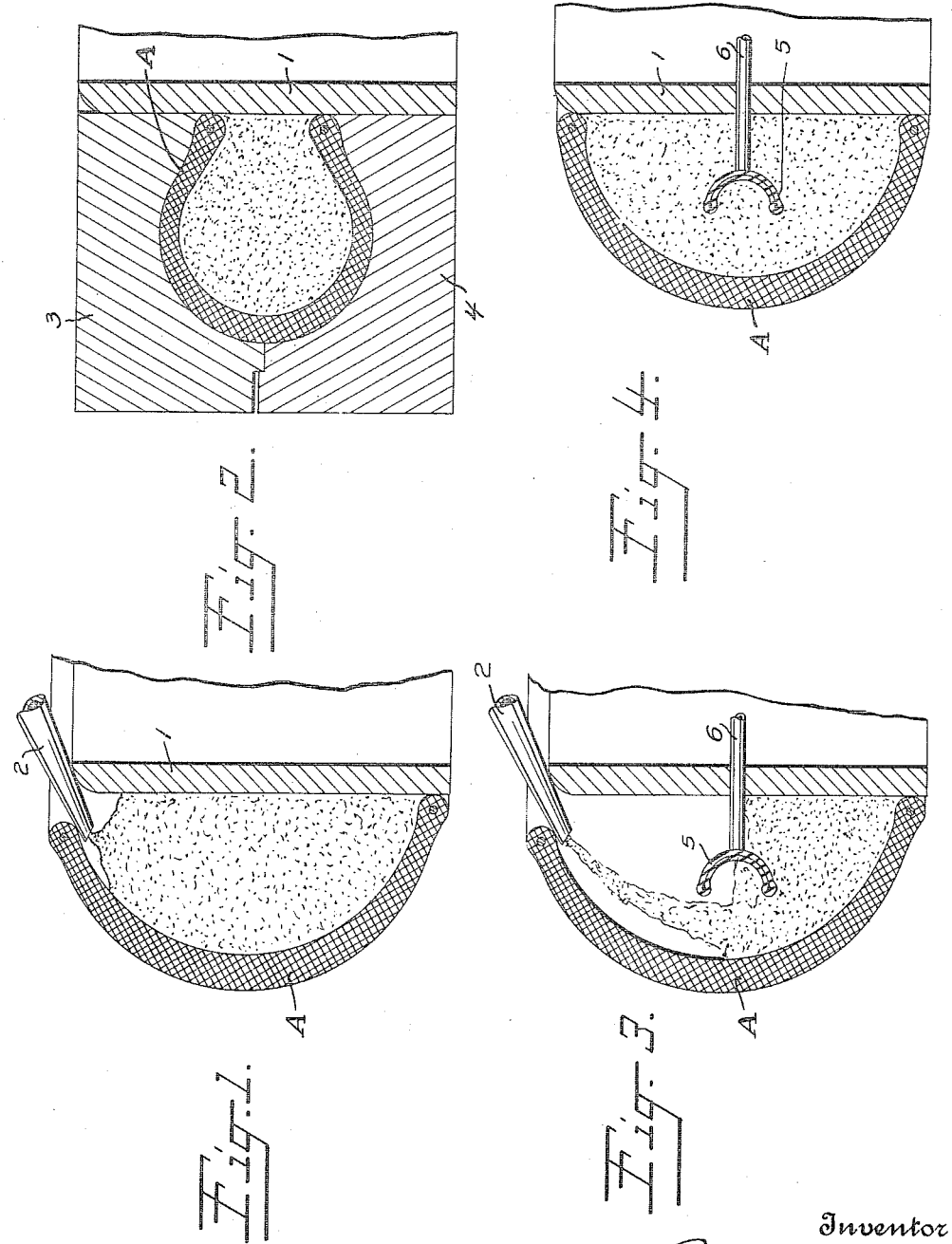

UNITED STATES PATENT OFFICE.

ERNEST HOPKINSON, OF NEW YORK, N. Y.

METHOD OF MAKING PNEUMATIC TIRES.

1,305,801.  Specification of Letters Patent.  Patented June 3, 1919.

Application filed October 12, 1917. Serial No. 196,133.

*To all whom it may concern:*

Be it known that I, ERNEST HOPKINSON, a citizen of the United States, residing in New York city, county of New York, and State of New York, have invented a certain new and useful Method of Making Pneumatic Tires, of which the following is a full, clear, and exact description.

The present invention relates to a method of making pneumatic motor vehicle tire casings of rubber and fibrous materials, the object of the invention is to place the unvulcanized casing in condition for vulcanization by simple steps which avoid the necessity of employing metal cores or extensible air bags and the like. Heretofore tire casings have been vulcanized either with a metal core filling the tire cavity or with internal pressure by means of an extensible air bag or tube, and these are soon destroyed by the repeated expansion and heat of several vulcanizing processes. A metal core is expensive, heavy and unwieldy, and does not permit of any stretching of the threads of the fabric plies composing the tire casing, inasmuch as the latter is built upon the core.

By my invention I take the unvulcanized tire casing in a condition in which its edges are spaced farther apart than the position in which they are vulcanized, this giving a greater cross section or area to the tire cavity. While holding the casing in this condition, I place within the same a quantity of some suitable comminuted material. This quantity will be predetermined as to amount when in a condensed or compacted condition to exert a given pressure upon the walls of the casing when the latter reaches its final position. After the material has be placed in the casing, while the edges of the latter are spaced apart, the base of the casing is closed and the edges thereof are forced toward each other. The edges are preferably forced toward each other by placing the casing between two outer mold members and by bringing these members together. Such action causes the contained material to distend the tire so that the latter completely fills the mold cavity. It will be seen that this operation results in forming a collapsible core (collapsible because it is made up of comminuted material) and at the same time giving final formation to the tire-casing and expanding the casing so as to tension the threads. The mold members are then secured together and removed to the vulcanizing press. After vulcanization the casing is taken from the mold and the comminuted material removed.

The method may also employ a tube within the tire cavity together with the comminuted material, the latter being interposed between the tube and the inner wall of the casing, the tube being in a collapsed or semi-collapsed condition. The final area of the tube and the quantity of comminuted material will be predetermined as to amount, so that when the edges of the casing reach their final position and the tube is brought up from its collapsed position to its final area, the material will be in a condensed or compacted condition and will exert a given pressure upon the walls of the casing.

After the tube and material have been placed in the casing while the edges of the latter are spaced apart, the edges of the casing are closed and thereafter are forced toward each other by means of the mold members. After the mold members are brought together, fluid, preferably water, is forced into the tube, so that the effective area of the latter is increased. Such action exerts a uniform pressure upon all of the comminuted material intermediate the tube and the inner wall of the tire casing, and causes the material to distend the tire so that the latter completely fills the mold cavity. The fluid forced into the tube is preferably water, as its degree of expansion under the heat of the vulcanizing process is substantial and may be accurately determined. The amount forced into the tube will be predetermined to displace a given area within the casing when expanded by the heat of the vulcanizing chamber. The comminuted material should be a material capable of heat conduction so that the heat will be carried to the inner wall of the casing. The method may also be carried into effect by placing the fluid within the tube before the latter is placed within the casing, as will hereinafter appear.

Figure 7:
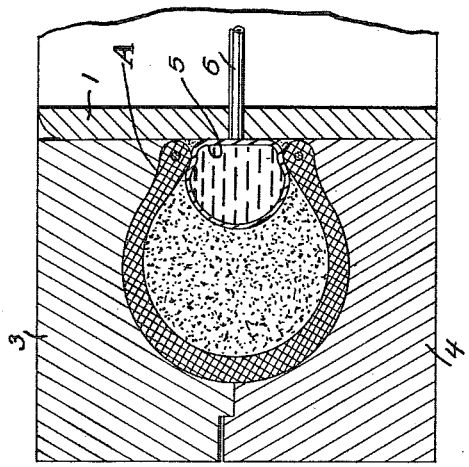
Figure 5:
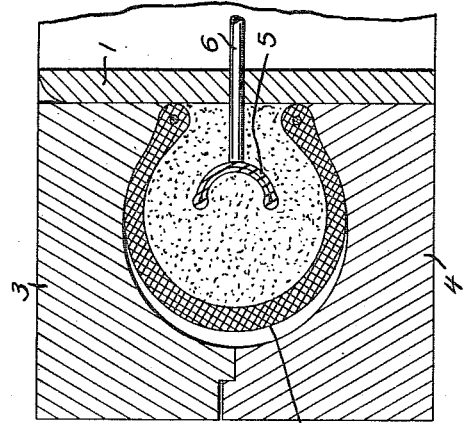

The steps of the method will now be described by reference to the accompanying drawings, in which Figure 1 is a transverse section of the casing with its edges spread apart and a quantity of comminuted material within its cavity. Fig. 2 is a similar sectional view illustrating the position of the walls of the casing after its edges have been moved toward each other by bringing upper and lower mold members into contact with the casing between them. Figs. 3, 4, 5, 6 and 7 are sectional views illustrating the method when a tube is employed in conjunction with the comminuted material. Fig. 3 illustrates the initial position of the casing and tube, the latter being supported by a partial charge of the comminuted material. Fig. 4 is a view similar to Fig. 3 showing a full charge of the comminuted material within the casing and the edges of the latter closed. Fig. 5 is a view illustrating the casing subsequent to the movement of its edges toward each other by bringing upper and lower mold members into mutual contact. Fig. 6 is a view of the casing in expanded position within the mold, the tube having been brought up from its collapsed condition to normal condition. Fig. 7 is a view of the casing in expanded position within the mold, the tube being placed adjacent the closure ring for the edges of the mold.

The unvulcanized tire casing may be formed in any suitable manner, as, for example, by the method disclosed in my application Serial No. 140,508, of Jan. 4, 1917. In carrying my method into effect, the casing with its edges separated farther apart than the position in which they are vulcanized is first filled with any suitable comminuted material, such as talc, chalk, soapstone, sand, or a mixture of two or more forms of comminuted material capable of ready heat conduction.

In some cases it may be found desirable to employ the tube, heretofore referred to, in conjunction with the comminuted material. But it will be understood that the tube is not indispensable to the method. When the tube is employed, however, a convenient manner of disposing the tube and comminuted material within the casing will be to place a partial charge of the comminuted material within the casing, and then to insert the tube so that it will be supported by the partial charge, as illustrated in Fig. 3 of the drawings. Thereafter the remainder of the charge of material may be placed within the casing, so as to be interposed between the tube and the casing wall. It will be understood that any suitable means may be employed for placing the comminuted material within the casing, and that a closure ring, or its equivalent, will be fitted within the casing to contact with one edge, or both of its edges, during the filling operation.

By reference to Fig. 1, it will be seen that the casing A is so related to the closure ring 1 that the latter closes the edges of the casing except for the introduction between the two, at the top of the ring, of a discharge pipe 2 for the comminuted material. A series of pipes 2 may be employed, and the pipes may lead to a common container for the comminuted material. The charge of comminuted material having been placed within the casing, the pipes 2 are withdrawn and the upper edge of the casing moved downward into contact with the ring 1. Thereupon the edges of the casing are forced toward each other from the position shown in Fig. 1 to the position shown in Fig. 2, and, when the tube is not employed in the method, such action causes the contained material to distend the tire. The forcing together of the two edges of the casing is preferably accomplished by placing the casing between upper and lower mold members 3 and 4, and by bringing the said mold members into mutual contact about the closure ring 1, so that the action of the comminuted material so distends the tire as to completely fill the mold cavity.

When tube 5 is employed in conjunction with the comminuted material, part of the charge of the material may be placed within the casing so as to afford a support for the tube, as illustrated in Fig. 3. Thereupon the tube may be placed within the casing in a collapsed condition. By "collapsed condition" I mean any condition less than the normal area of the tube. If necessary the tube may be collapsed by withdrawing the air therefrom, as for example, through the pipe 6. The tube may be of a size to lie in contact with the ring 1 as shown in Fig. 7 or to be completely surrounded by comminuted material as in Figs. 3–6. After the tube has been placed within the casing the latter receives the remaining portion of the charge of comminuted material. The charge of material is not of itself sufficient to expand the casing when the edges of the latter are brought into final position, but the quantity is so proportioned to the final area of the collapsed tube that the latter when brought up from its collapsed position to its final position in the vulcanizing process, will, by exerting a uniform pressure throughout the circumference of the casing, expand the casing to its final position within the mold. The method is such that it is unnecessary to distend the walls of the tube, or in fact to fill the tube, as will hereinafter appear.

The casing having received its complete charge of comminuted material and the discharge pipes 2 having been withdrawn, the edges of the casing are brought into contact with the closure ring 1 as shown in Fig. 4. Thereupon the upper and lower mold members 3 and 4 are moved into mutual contact, with the casing between them, so that the edges of the casing are moved toward each other and the parts assume the position shown in Fig. 5 the tread and a portion of the side walls of the casing being spaced from the mold. Thereupon water or other liquid may be forced into the tube so that it is brought up from its collapsed position to its final position, and either to its normal area, as illustrated in Fig. 6, or to less than its normal area, such action exerting a uniform pressure upon the comminuted material intermediate the tube and the walls of the casing and distending the latter to contact with the walls of the mold. The water or other expansible fluid may be placed in the tube prior to its insertion within the casing, the expansion of the fluid under the heat of the vulcanizing process being utilized to distend the casing walls to their final position within the mold. In such case it will be unnecessary to remove the water from the tube after a vulcanizing operation, the water being permitted to cool and contract prior to each use of the tube. And obviously it will be unnecessary to employ such a quantity of water as to entirely fill the tube during the vulcanizing process, although this may be done if desired.

When the two mold members are in closed position they may be secured together, preferably by means which will permit a slight opening up or yielding of the mold members when the pressure thereon has been released, although it is unnecessary to provide the mold members with any fastening means whatever. The mold members may be brought in mutual contact about the casing by any suitable apparatus and the removal of the mold from such apparatus will cause the members of the mold to only slightly yield as the force tending to separate the mold assemblage becomes inert immediately upon a slight release.

The assembled mold with the tire casing therein is removed from the apparatus and is placed with other molds on the hydraulic ram in the vulcanizing press, in the usual manner, and after the press is closed, pressure is applied to the ram which closes all of the molds. When the vulcanization is completed the molds are taken out, opened up and the comminuted material and tube, when the latter is employed, removed from the vulcanized casing.

In such case in an unvulcanized casing having inextensible edges or when side wires are employed, the tension upon the threads in the vulcanized tire may be controlled by the distance between the wires and the quantity of comminuted material, or comminuted material and tube area, used to cause the casing to fill the mold cavity.

As heretofore pointed out, air bags and tubes heretofore employed to expand tire casings within the mold have a very short life, being rapidly destroyed by the repeated heat and expansion of several vulcanizing operations. In the present method it is unnecessary to expand the tube, therefore the life of the latter is very greatly increased.

It will be seen that the advantages of my method are great. In the first place I make a solid material perform the function of extending the carcass within the mold, when the comminuted material alone is employed. Secondly, I am able to employ a tube in conjunction with the comminuted material in such manner that it is unnecessary to expand the walls of the tube, and the tube may be given a charge of fluid and thereafter repeatedly used without recharging. Thirdly, I am able to obtain any desired tension in the threads of the casing by regulating the quantity of comminuted material, or comminuted material and tube area, which is employed. The necessity for bolting or otherwise securing the molds against a high fluid pressure is avoided, it only being necessary to employ devices which will maintain the association of the mold members in the absence of high pressure, as the force tending to separate the members of the mold assemblage becomes inert immediately upon a slight release. The method renders the use of expensive cores and air bags unnecessary, and the distending action is such that the vulcanization fixes the threads of the fabric plies under uniform tension.

The word "tire" as used above and in the claims means tire casing; "mold" means any outer confining structure, as for instance, outer wrappings.

Having described my invention what I claim as new and desire to have protected by Letters Patent is:

1. The method of making a tire casing which comprises forming the casing with an opening along its inner circumference wider than the finished casing, closing the opening and placing a quantity of mobile material in the cavity of the casing sufficient to afford an internal support for the finished casing, thereafter bringing the edge portions to their final tire positions, and finally vulcanizing.

2. The method of making a tire casing which comprises forming the casing of a different shape than the finished tire and with an opening along its inner circumference, closing the opening and placing a pressure transmitting mobile material in the cavity of the casing, subjecting an edge portion of the casing exteriorly to the influence of a moving force whereby the portion is moved inwardly and an outwardly acting pressure is thereby imparted to the said material to give the casing final formation and finally vulcanizing.

3. The method of making a tire casing which comprises forming the casing of a different shape than the finished casing and with an opening along its inner circumference, closing the opening and placing a pressure transmitting mobile material in the cavity of the casing, placing about the casing rigid mold members having a cavity of the shape of the finished casing, moving an edge of the casing toward the opposite edge by moving the adjacent mold member toward the opposite mold member thereby imparting an outwardly acting pressure to the said material to conform the casing to the surrounding mold walls and finally vulcanizing the casing.

4. The method of making a tire casing which comprises forming the casing of a smaller size than the finished casing and with an opening along its inner circumference, closing the opening and placing a pressure transmitting mobile material in the cavity of the casing, subjecting an edge portion of the casing exteriorly to the influence of a moving force whereby the portion is moved inwardly and an outwardly acting pressure is thereby imparted to the said material to effect a stretching of the casing to final size, and finally vulcanizing.

5. The method of making a tire casing which comprises forming the casing of a smaller size than the finished casing and with an opening along its inner circumference, closing the opening and placing a pressure transmitting mobile material in the cavity of the casing and placing about the casing rigid mold members having a cavity of the shape of the finished casing, moving an edge of the casing toward the opposite edge by moving the adjacent mold member toward the opposite mold member thereby imparting an outwardly acting pressure to the said material to effect a stretching of the casing to conform it to the surrounding mold walls, and finally vulcanizing the casing.

6. The method of making a tire casing which comprises forming the casing, placing a quantity of comminuted material within the cavity thereof sufficient to fill said cavity when in final shape, placing about the casing rigid mold members having a cavity of the shape of the finished casing, moving the members into final position thereby coacting with the said material to cause the casing to conform to and snugly engage the interior walls of the mold.

7. The method of tire making by placing a tube within an unvulcanized tire, disposing comminuted material intermediate the tube and the walls of the tire, compacting the comminuted material within the tire, forcing fluid within the tube to exert a pressure upon the comminuted material, and finally vulcanizing the tire.

8. The method of tire making by placing comminuted material and a collapsed tube within an unvulcanized tire, compacting the comminuted material within the tire, forcing fluid within the tube to increase the effective area of the latter, thereby exerting pressure upon the tire, and finally vulcanizing the tire.

9. The method of tire making which consists in placing comminuted material and a tube within an unvulcanized tire, moving the edges of the tire toward each other to compact the material, forcing fluid within the tube to exert a pressure upon the comminuted material and finally vulcanizing the tire.

10. The method of tire making by placing comminuted material and a tube containing an expansible fluid within an unvulcanized tire, compacting the comminuted material within the tire, and vulcanizing the tire within a mold, so that the tire is distended by the expansion of the fluid within the tube.

Signed at New York, New York, this 10th day of October, 1917.

ERNEST HOPKINSON.